United States Patent [19]
Brandon et al.

[11] Patent Number: 5,934,684
[45] Date of Patent: Aug. 10, 1999

[54] RETRACTABLE SEGMENTED PACKING RING FOR FLUID TURBINES HAVING GRAVITY SPRINGS TO NEUTRALIZE PACKING SEGMENT WEIGHT FORCES

[76] Inventors: Ronald Earl Brandon, 652 Jubilee St., Melbourne, Fla. 32940; David Earl Brandon, 2166 E. Hampton Rd., Binghamton, N.Y. 13903

[21] Appl. No.: 08/863,590

[22] Filed: May 27, 1997

[51] Int. Cl.⁶ .................................................. F16J 15/447
[52] U.S. Cl. .......................................... 277/421; 277/422
[58] Field of Search .................................. 277/422, 421, 277/419, 418, 416, 412

[56] References Cited

U.S. PATENT DOCUMENTS

| | | | |
|---|---|---|---|
| 5,395,124 | 3/1995 | Brandon | 277/419 X |
| 5,464,226 | 11/1995 | Dalton | 277/412 |
| 5,603,510 | 2/1997 | Sanders | 277/419 X |

*Primary Examiner*—Harry C. Kim
*Assistant Examiner*—David E. Bochna
*Attorney, Agent, or Firm*—Ross, Ross & Flavin

[57] ABSTRACT

A segmented seal ring and spring system for steam turbines for minimizing leakage between rotating and stationary components, and preventing damage and wear thereto, with a single gravity spring contained in the lower half seal ring segment to produce an upward force which neutralizes the downward force caused by the weight of all the packing segments; so that only a small fluid pressure force is required to close the lower seal segments; the various segment lenths being adjustable to optimize closure sequence; with pairs of adjacent seal ring segments being optionally hinged to optimize proper motion capability, and individual segments optionally having one or more seal teeth removed to optimize motion capability; with adjacent pairs of ring segments optionally being slideably pinned to force simultaneous radial motion.

5 Claims, 4 Drawing Sheets

RETRACTABLE SEGMENTED PACKING RING FOR FLUID TURBINES HAVING GRAVITY SPRINGS TO NEUTRALIZE PACKING SEGMENT WEIGHT FORCES

BACKGROUND OF THE INVENTION

1. FIELD OF THE INVENTION

The present invention relates to seals employed in elastic fluid axial flow turbines and, more particularly, to segmented packing ring seals arranged both where rotatable shafts penetrate stationary turbine casings and, in addition, internal to the casings between stages and turbine sections.

2. DESCRIPTION OF THE PRIOR ART

Generally, such known seals prevent or reduce leakage of the fluid by creating small clearance areas with low flow coefficients between the rotating and stationary parts. Improved efficiency, minimized loss of fluid and prevention of undesirable side effects caused by leakage of fluid are objectives of such seals.

Also, these segmented, labyrinth type seals are vulnerable to rubbing damage caused by turbine misalignment, vibration and thermal distortion. Most of these damage causing factors are more likely to occur during starting, at light loads or following sudden loss of load. As a result, it would be desirable to create a condition of relatively large clearance during these conditions, to minimize possible damage to the seals, and yet still accomplish a small clearance condition at higher loads. The higher load condition corresponds to operation when efficiency is of greatest value and where turbine operation is stable relative to most of the factors which can cause damage to the seals.

It should be recognized that turbine designers already take significant steps to minimize fluid leakage. The seals are made of materials specially selected to minimize damage caused by rubbing. The seal geometry is designed with thin teeth to generate the least amount of heat and force during rubbing situations.

Retractable packing rings which, during start-up conditions, have large radial clearance that automatically decreases to a small clearance condition when a predetermined flow condition has been reached, have also been successfully applied in turbine applications where the pressure forces are significantly greater than the weight forces of the packing segments. In the low pressure stages, however, weight forces are often too large to be successfully overcome by available turbine pressure forces.

In U.S. Pat. No. 5,395,124 issued on Mar. 7, 1995 to Ronald E. Brandon there is disclosed a segmented, retractable, labyrinth-type shaft sealing system for low pressure turbines wherein the packing segments are provided with a combination of gravity or levitation springs that provide a vertical force to neutralize segment weight forces and butt springs that resist pressure forces so as to cause a large clearance at turbine start up and then permit segment motion to allow the clearance to become small after operational conditions are established.

The above patented system has provided satisfactory performance, but with some disadvantages that the subject invention overcomes. These disadvantages include: machining difficulty and expense to properly provide gravity spring holes in the diaphragm or casing and in the packing segments to coincide with the center of gravity of the packing segments; a tendency for the upper half segments to stay in the open or large clearance position until relatively large turbine loads are reached; and some assembly difficulty of springs and segments in the lower half.

SUMMARY OF THE INVENTION

Accordingly, it is an object of the present invention to provide an improved retractable seal ring arrangement for turbine locations where only small pressure drops are present during normal operating conditions.

It is another object to provide a seal ring arrangement wherein the clearance of the seal ring segments is large during turbine starting, shutdown and low load conditions, and such clearance is small during turbine operation at moderate to high loads.

It is another object to provide a seal ring arrangement wherein the seal ring segments are caused to move in a uniform manner between a large clearance position and a small clearance position.

A still further object is to provide a seal ring arrangement having spring means arranged to effectively counteract the weight of the segments to allow the motion of the segments from large to small clearance to occur with small pressure drops across the seal in accordance with the fluid pressure forces, weight and friction forces on the individual seal ring segments and on their circumferential position within the turbine.

Another object is to decrease the cost of maintaining turbines due to seal damage, while increasing operating efficiency by permitting smaller operating clearance with lower leakage flow coefficients than presently known.

These, and other objects, are achieved by the present invention which provides a segmented seal ring and spring system for steam turbines for minimizing leakage between rotating and stationary components, including a segmented seal ring being supported by and at least partially contained in an annular T-shaped groove formed in the turbine casing and extending circumferentially around the turbine shaft. The spring system includes springs positioned to be biased against the segments of the seal ring to urge the segments radially outwardly toward a large clearance position of the seal ring with respect to the turbine shaft.

The individual strengths of the springs are selected depending on the circumferential positions of the seal segments, the fluid pressure forces, and the weight and friction forces to thereby assure that the seal ring segments are in the large clearance position at low shaft speeds and small turbine loads, whereas at moderate to high flows and high working pressure, working fluid which is freely admitted to the annular space between the casing and the ring segments will overcome the spring forces and urge the seal segments into the small clearance position.

A special gravity or levitation spring is provided in the lowest, lower half seal ring segment with the lower end of such spring in contact with the turbine casing while the upper spring end is biased against the seal segment to produce an upward force on the segments to counter the downward force caused by the weight of the segments. The gravity spring has a spring force in the vertical direction which is equal to the weight of all the segments which it supports so that the fluid pressure force required to close the seal segment is approximately equal to the radially outward biasing spring force and the friction forces.

To minimize rocking of the segments in the large clearance position, the outer diameter of the segments, where they make contact with the casing, should be machined to match the diameter of the casing.

The segments can be arranged to have interlocking pins that permit adjacent butts to separate as the large clearance position occurs, yet require both adjacent butts to shift radially at the same time.

Similarly, selected adjacent butts can have interlocking pins that do not permit circumferential separation of adjacent butts but do allow hinging of the connected segments. This also allows the force of a gravity spring applied to one butt to be shared by the adjacent butt, and radial motion in either direction to occur simultaneously for both segments.

Improved segment motion characteristics may be obtained by increasing the length of the top and bottom segments such as to 120°, while making each side segment smaller, such as four 30° segments, one above and one below the horizontal joint on each side.

The lower segments can be further assisted in closing to the small clearance position at the side locations by the addition of springs pushing the segments radially inwardly near the horizontal joints.

The upper and lower segments may be made to have direct or indirect contact with each other.

DESCRIPTION OF THE PREFERRED EMBODIMENTS

Figure 1:
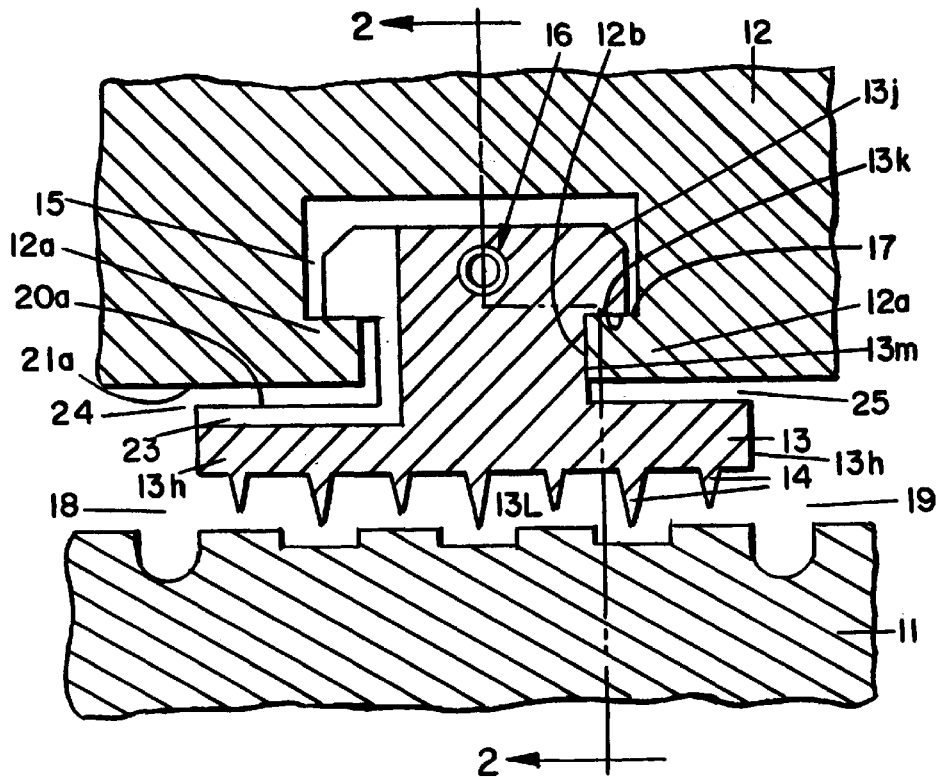
FIG. 1 is a partial longitudinal sectional view of a horizontal elevation of a portion of one stage of a multistage axial flow elastic turbine, with the section being taken through one segment of a segmented seal ring.
Figure 2:
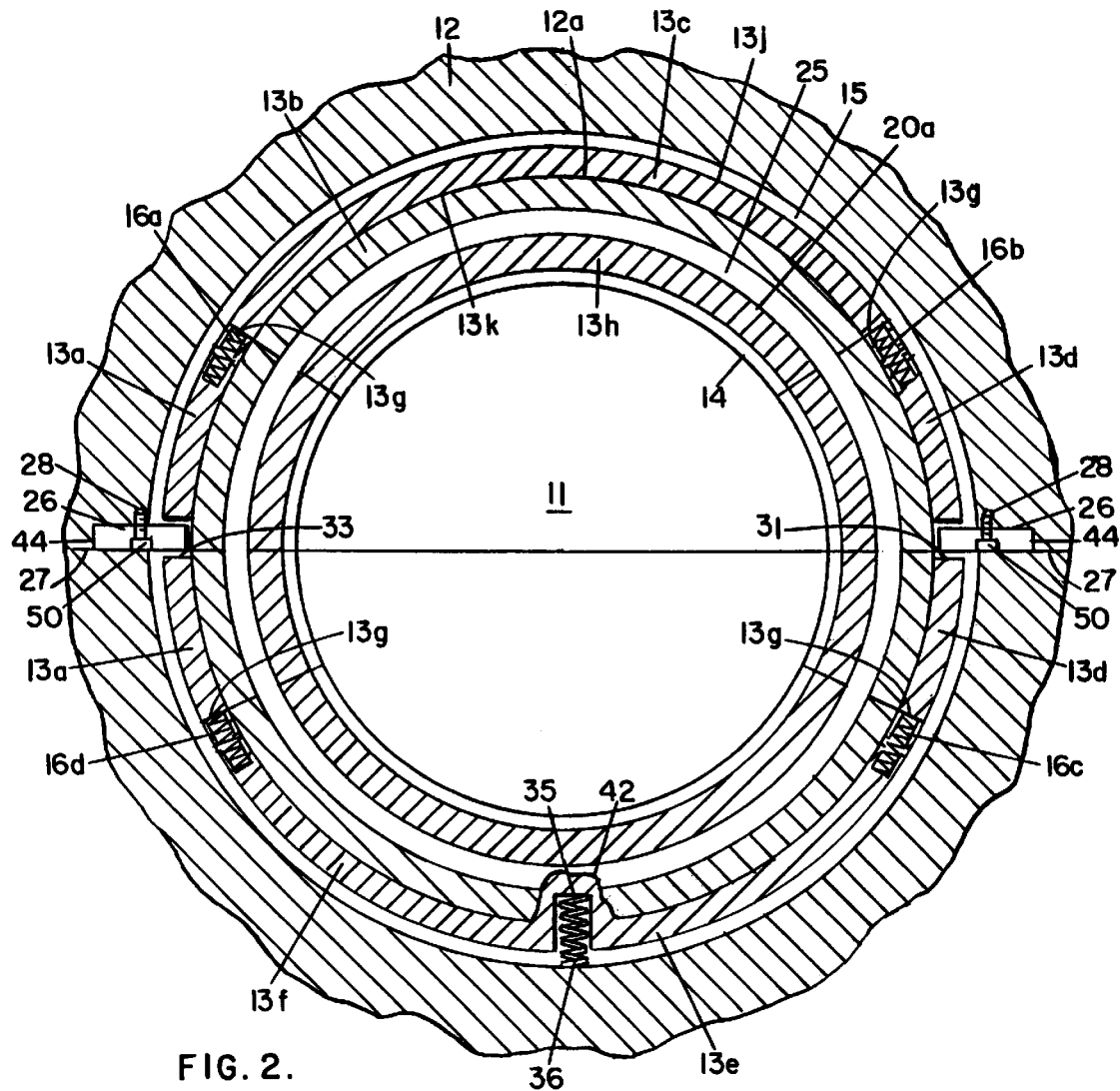
FIG. 2 is a transverse cross sectional view taken along lines 2—2 of FIG. 1 showing a six segment seal ring with springs for biasing the segments radially outwardly, and with a gravity spring in the lowest sealing ring segment, according to one embodiment of the invention.

Referring to FIGS. 1 and 2, the turbine includes a rotor or shaft, a portion of which is shown at 11, and a casing, a portion of which is shown at 12. With regard to interstage seals, it is noted that casing 12 may also be referred to as a diaphragm. A seal ring 13 is shown comprising six segments according to the embodiment shown in FIG. 2 extending around rotor 11. It should be understood that several such seal rings 13 could be arranged in series. Also, it should be understood that the remainder of the turbine necessarily includes means, not shown, for introducing steam at high pressures and exhausting it at lower pressures, with conventional nozzles, buckets, wheels and other components which do not need inclusion herein to describe the seal function which is carried out by the seal ring of the present invention. In general, the seal ring shown and described herein is typical of the many rings employed throughout the turbine, with the exception of the seal ring modifications made in combination with the spring design described herein according to the present invention. Also, it is to be understood that "seal ring 13" and "seal ring segment 13" as used herein may apply to either a ring or segment and, therefore, should be read in the context of the sentence describing the same.

Seal ring 13 includes a plurality of teeth 14 that are disposed in opposition to circumferential portions of the rotor 11 which are alternately stepped up and down in radius. It is noted that other tooth arrangements may be employed. With high pressure fluid at side 18 of seal ring 13 and low pressure fluid at side 19, the left and right sides respectively of seal ring 13 shown in FIG. 1, there will be a positive force to cause fluid leakage between the multiple restrictions formed between the small clearance opening between teeth 14 and rotor 11. The combination of the clearance area, the relative sharpness of the teeth, the number of restrictions, the fluid conditions including pressure and density, and the geometry of the leakage path determine the amount of leakage flow according to formulae and empirical components which are well known.

Seal ring 13 is retained in a groove 15 of casing 12. According to the embodiment shown in FIG. 2, seal ring 13 is comprised of six segments 13a–13f arranged in a ring around rotor 11, with the segments being disposed within casing groove 15 to accommodate assembly or disassembly of the casing by locating the seal ring sections to separate at a joint 27 of the casing. Coil springs, generally indicated by the numeral 16 in FIG. 1, but more specifically indicated by 16a–16d in FIG. 2 are located at segment ends, indicated by butt ends and parting lines 13g in FIG. 2 of each seal ring segment 13, interposed in a compressed condition between the adjacent ends 13g of the segments to bias the ring segments to move to the large clearance position. Springs 16a–16d are positioned to fit in bores or pockets formed in the ends 13g of the seal segments 13. Here top springs 16a and 16b are interposed between the top segment 13b and the two upper side segments 13a and 13c while the two lower springs 16c and 16d are interposed between the bottom segment 13e and the two lower side segments 13d and 13f, as shown in FIG. 2.

Positive circumferential location of segments 13a–13f and retainment of the seal segments and springs 16a–16d are assured by anti-rotation keys 26 which are provided above casing joint 27. Each anti-rotation key 26 includes a rectangular key block fitted in grooves 44 in the left and right sides of casing 12. The key blocks protrude out from casing 12 into spaces 31 and 33 where such key blocks provide a fixed horizontal support surface for the upper segments of seal ring 13. Anti-rotation keys 26 are secured to casing 12 by mounting screws or bolts 50 attached at the left and right sides to key slots 44 by threaded screw ends 28 extending into casing 12 in grooves 44.

Referring again to FIGS. 1 and 2, each segment of seal ring 13 is shown including an inner ring portion, indicated by the numeral 13h and having the seal teeth 14 extending from its radially inwardly extending surface while its radially outwardly extending surface 20a limits the large clearance by means of its contact with the radially inwardly extending surface 21a of casing 12. Seal ring 13 also includes an outer ring portion 13j disposed within casing groove 15 with an inner circumferential surface 13k which, as described below, limits the small clearance position of the seal ring segments by restraining their radial inward movement by contact of such surface 13k with a surface 17 on a shoulder 12a of casing 12. Seal ring 13 also includes a neck portion 13L between the inner ring portion 13h and the outer ring portion 13j into which shoulder 12a of casing 12 is interlocked to thereby axially locate the ring segment. Seal ring neck portion 13L forms a T shape with outer ring portion 13j and such neck portion 13L provides a contact pressure surface by means of contact of its neck surface 13m with shoulder surface 12b of casing 12.

Referring to FIG. 2, a gravity spring 36 is contained in bottom seal segment 13e and extends downwardly to contact casing 12. As shown at 42 in FIG. 2, gravity spring 36 produces an upward force on segment 13e so as to counter the downward force caused by the weight of all segments 13.

It is desirable that the seal ring, when in its open, retracted position, be in a stable, non-rocking position with the same tooth-to-shaft clearance at both ends of the seal segment. This cannot happen if the machined radius of surfaces 20a of each ring segment and surfaces 21a of casing 12 are not the same. Surfaces 20a, would conventionally be cut to provide a diameter of about 5 millimeters smaller than the circle of surfaces 21a. As suggested above, this is undesirable. The packing segments should be cut to provide surfaces 20a with the same or larger diameter as surfaces 21a, while still permitting the desired motion.

If this is not practical, a second satisfactory method is to add raised surfaces at each end of each segment that create a proper ability for motion of the segment toward the casing surface 21a from the closed, small clearance position.

Figure 8:
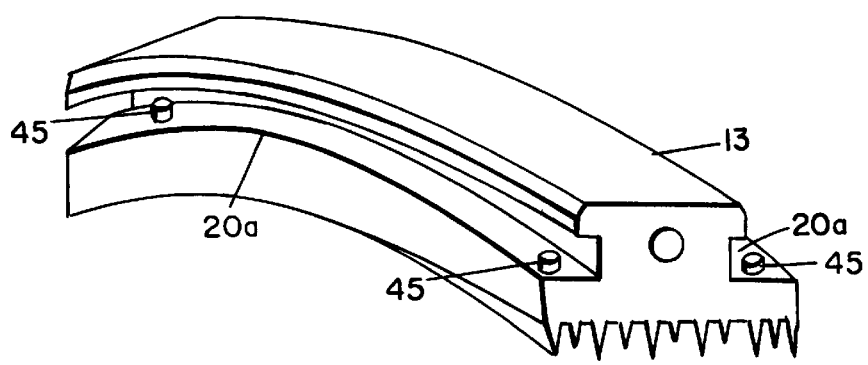
FIG. 8 is a perspective view of a further modified form of seal ring segment.

As illustrated in the modified form of the invention shown in FIG. 8, surfaces 20a of each ring segment 13 are modified by the addition of raised surfaces 45 provided adjacent each end of the ring segment.

Raised surfaces 45 will make the opening contact with surfaces 21a of casing 12, permitting proper opening motion even though the diameter of surfaces 20a of the ring segment are not the same as surfaces 21a of casing 12.

Figure 3:
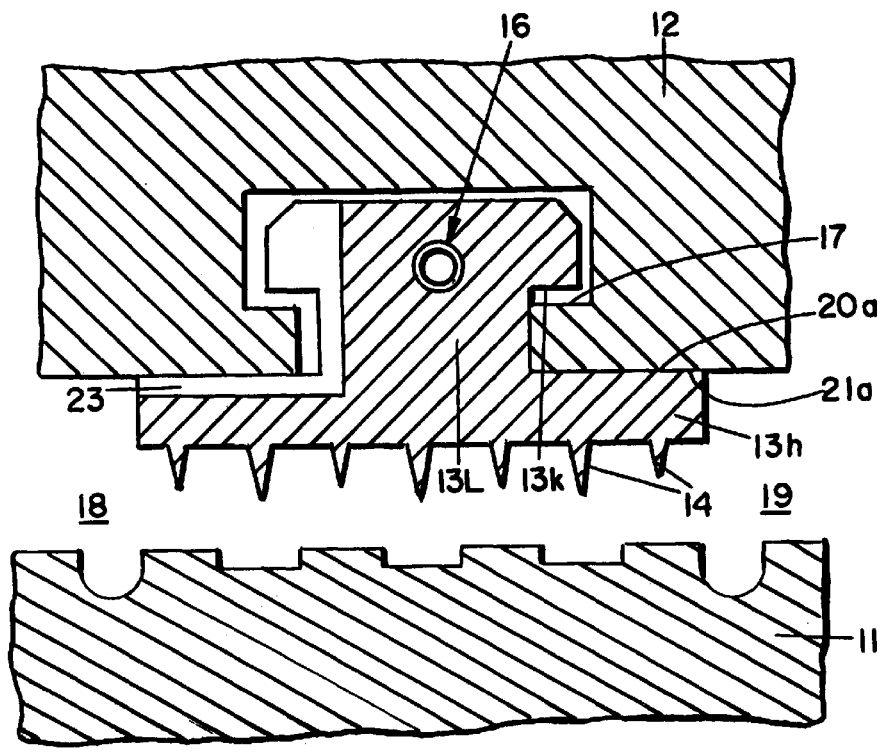
FIG. 3 is a partial longitudinal view as in FIG. 1, but differing in that the segment seal ring is shown in the large clearance position, as contrasted with the small clearance position shown in FIGS. 1 and 2.

At very low load conditions, only the weight of seal ring segments 13, the confining limits of casing 12 and the force of springs 16a–16d and gravity spring 36 act on seal rings 13. The springs are selected with sufficient force and dimension under these conditions to cause seal ring segments 13 to separate at four segment joints where springs 16a–16d are installed. In the preferred arrangement wherein springs 16a–16d are interposed between the adjacent butt ends 13g of the rings, such springs urge the segments in a circumferential direction to cause the segments to separate at four segment joints, thereby causing the seal ring segments to seek larger diameters limited by the defined large clearance position, as shown in FIG. 3, where there are no annular spaces 24 and 25. Here the radially outwardly extending surface 20a of inner ring portion 13h contacts the radially inwardly extending surface 21a of casing 12. At this point of contact, referred to herein as the "large clearance position", shown in FIG. 3, no further enlargement of the seal ring can occur. Annular spaces 24, 25 are sized to permit, by the radial outward movement of the ring segments 13, sufficient space to accommodate the worst expected transient misalignment of rotor and casing, without damage to seal ring teeth 14. This annular space dimension will vary, depending on the type and size of the turbine. Upon the buildup of load, the pressure forces will overcome the forces of the springs, and seal ring segments 13 will move radially inwardly up to the point of contact between segment surface 13k and casing shoulder surface 17.

One advantage of this spring and seal ring design is that the springs interposed at the circumferential ends 13g between the seal ring segments 13 act to maintain such segments in their circumferential positions so that closure of the seal ring segments to the small clearance position does not require both circumferential and radial movement. This is because the seal ring segments and the springs interposed therebetween together form a continuous ring around the rotating shaft which expands and contracts between the large and small clearance positions. This spring and seal design maintains and controls the circumferential positioning of the seal ring segments so that closure does not require both radial and circumferential movement of the seal rings and any interference or lock-up of the seal rings between each other is avoided. Furthermore, gravity spring 36 assists in reducing or eliminating the effect of the weight forces of the lower seal segments which might otherwise interfere with the radial inward movement of the seal rings, as will be described in further detail hereinbelow.

After the turbine has been accelerated to operating speed and partially loaded, the worst of thermal gradients, vibration and misalignment problems are ended. As the load is increased, the fluid pressure increases proportionately around the rings in such fashion, as discussed further, hereinbelow, to cause springs 16 to be compressed and seal ring segments 13 to move radially inwardly until restrained by contact of seal ring surface 13k with casing surface 17. The dimensions of the seal ring 13 at its surface 13k and casing surface 17 are selected to create the smallest clearance between teeth 14 and the rotor surface determined to be practical for loaded, relatively steady state operations.

In FIGS. 1 and 2, seal ring 13 is shown in its high load, small clearance condition. The higher pressure side of the seal is indicated at numeral 18. This higher pressure persists in the annular spaces 24 and 15 as the result of an open communication created by one or more openings 23. The openings may also, for example, be made by local cutouts in the high pressure side of shoulder 12a. The relatively low pressure side of the seal is indicated by the numeral 19, and such lower pressure condition persists also in annular space 25.

It can be readily recognized that the resultant axial force of these pressures will cause the seal ring to be pushed toward low pressure area 19 so as to create a leak resistant seal between contact seal surface 13m and casing surface 12b. For a geometry of known dimensions and pressures, the magnitude of this axial force can be easily calculated. Also, there can be calculated the radial forces required to overcome metal-to-metal friction in order to move the seal ring in a radial direction.

In a similar fashion, but somewhat more complicated, the radial forces can also be determined. With the exception of the pressure distribution along the seal ring inner surface, on inner seal portion 13h, facing rotor 11, all other pressures were identified in the two paragraphs above. There will be a pressure drop across each tooth 14 of the seal. Using the known condition of flow continuity through each tooth, with constant enthalpy expansions, a relatively accurate distribution of pressure can be calculated using a series of constant area throttlings. On some packing rings, a high mach number will exist to complicate the calculation, but this will be known and accounted for by those skilled in the art.

The radial pressure distribution is used to select the dimensions of seal ring 13 to achieve the appropriate resultant inward force on the seal ring 13, as discussed in reference U.S. Pat. Nos. 5,395,124 and 4,436,311. The design goal is to establish for seal ring 13 a force condition that will cause ring 13 to overcome its weight, spring and friction forces so as to shift such seal ring to its inward or small clearance position, shown in FIGS. 1 and 2, for the fluid pressure conditions which can be predicted to exist when the turbine is operating at a small, but significant, load such as 15 to 35%.

As will be recognized by those familiar with elastic fluid turbines, the internal pressure at most locations throughout the turbine is approximately proportional to the load. As the load and mass flow is increased, local pressure is increased in approximately linear fashion. Under these circumstances, the pressure drop across turbine stages and most turbine seal rings also increases in a predictable and linear fashion with increasing load and fluid flow. It is this relationship that can allow a designer to select a condition of load and pressure for each seal ring wherein the pressure forces can be expected to overcome the combination of weight, spring and friction forces so as to move the seal ring to its small clearance position. As described above, the designer can partially control this circumstance by varying the dimensions, weight and spring constants employed within the seal ring and spring combination.

In the example of sealing rings operating in high pressure portions of turbines, the weight forces are small relative to available steam forces and proper operation is assured as described in the above-referenced U.S. Pat. No. 4,436,311.

However, for turbine locations with relatively small pressure conditions, the segments can be made lighter in weight and with weaker spring constants for the radially outwardly directing springs, in this case springs 16. These weight and spring constant adjustments may not be adequate. Thus, the need to provide gravity springs 36 for the purpose of opposing the effects of gravity on seal segments 13, as described above, that would ordinarily require adequate pressure forces to not only compress springs 16 and overcome friction, but to additionally lift the weight of the lower seal segments in order to cause such segments to shift to the close clearance position. Spring 36 must provide a vertical force approximately equal to the weight of all segments. It is noted that in the case of the upper seal segments, such as shown in FIG. 2, the equivalent effect of gravity springs 36 is provided by springs 16a through 16d. Such springs 16 must be selected and sized to provide a vertical force equal to the weight of all higher segments plus an additional amount to resist a chosen level of pressure forces tending to force the segment toward the close clearance position. Note that with no butt gap at the top centerline, there is no tendency for the sagging at that location discussed in U.S. Pat. No. 5,395,124.

The segment lengths are improved over previous six segment retractable packing inventions which employed segments of approximately equal length in all circumferential positions. In the subject invention, the top and bottom segments are of approximately 120° arc, while four approximately equal 30° arc segments are employed at the sides, with one segment each above and below the horizontal joint on each side.

Use of the 120° bottom segment decreases the force required of the lower butt springs; also, since these springs are oriented closer to vertical, the lateral force component of these springs, which delays side closure of the segment, is also reduced.

By use of one bottom gravity spring, it can be conveniently placed in a single bore hole 35 located in the packing segment 13e, eliminating the need to drill complicated multiple holes in casing or diaphragm 12. This also reduces assembly and disassembly problems, enabling packing installation or removal with the rotor in place.

Compared to previous four 90° packing designs, the present invention can permit closure to the small clearance position with less stage pressure drop. It also eliminates the need for casing or diaphragm holes and simplifies assembly and disassembly.

Use of the 120° top segment reduces the side forces necessitated in the butt springs of either four or six equal arc segment designs previously employed, thus allowing closure with smaller fluid pressure drops.

As mentioned previously, lower butt springs 16c and 16d should be designed to have a vertical component of force in the large clearance position to support the weight of all segments above those springs, plus a selected pressure load. This eliminates the need for any lower half keys 26 and also encourages the simultaneous motion of the upper and lower side segments when a proper pressure drop condition has been reached. It is thus noted that by altering the top and bottom segment arc lengths, the forces necessary to allow or prevent motion of the segments may be tuned to encourage motion of the various segments to occur near to a simultaneous pressure condition.

In the same way, advantage can be taken of the geometry of existing packing designs to change the radial forces for a given pressure condition. One or more seal teeth 14 can be removed from the discharge side of selected seal segments to increase radial force without changing weight or friction. This should be applied to these segments where weight forces are a problem.

Figure 4:
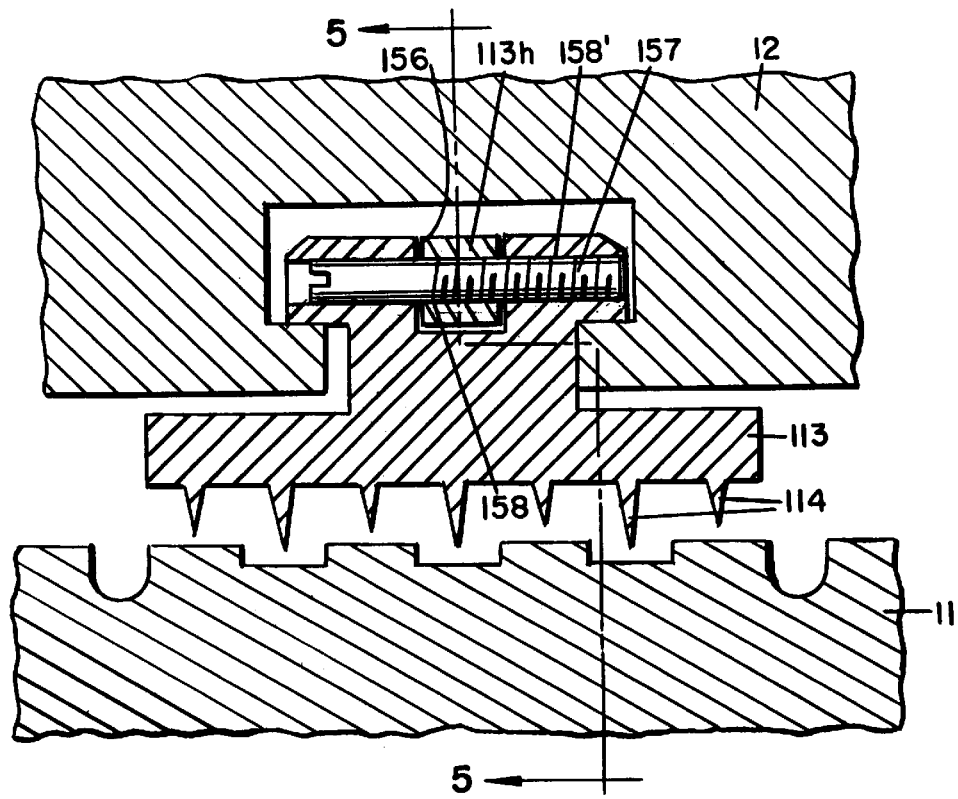
FIG. 4 is a partial longitudinal sectional view of a horizontal elevation showing a portion of a modified four segment seal ring with a hinged connection of two adjacent packing segments.
Figure 6:
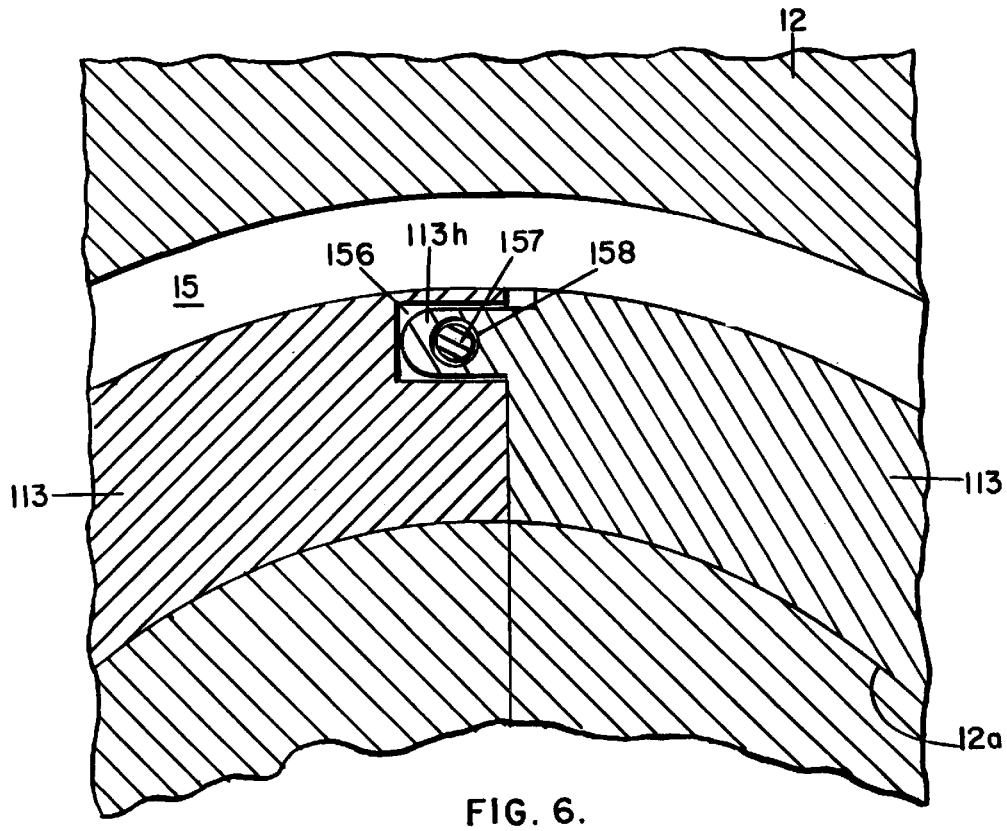
FIG. 6 is an enlarged, fragmentary, transverse cross sectional view of the upper hinge and pin arrangement shown in FIG. 5.
Figure 5:
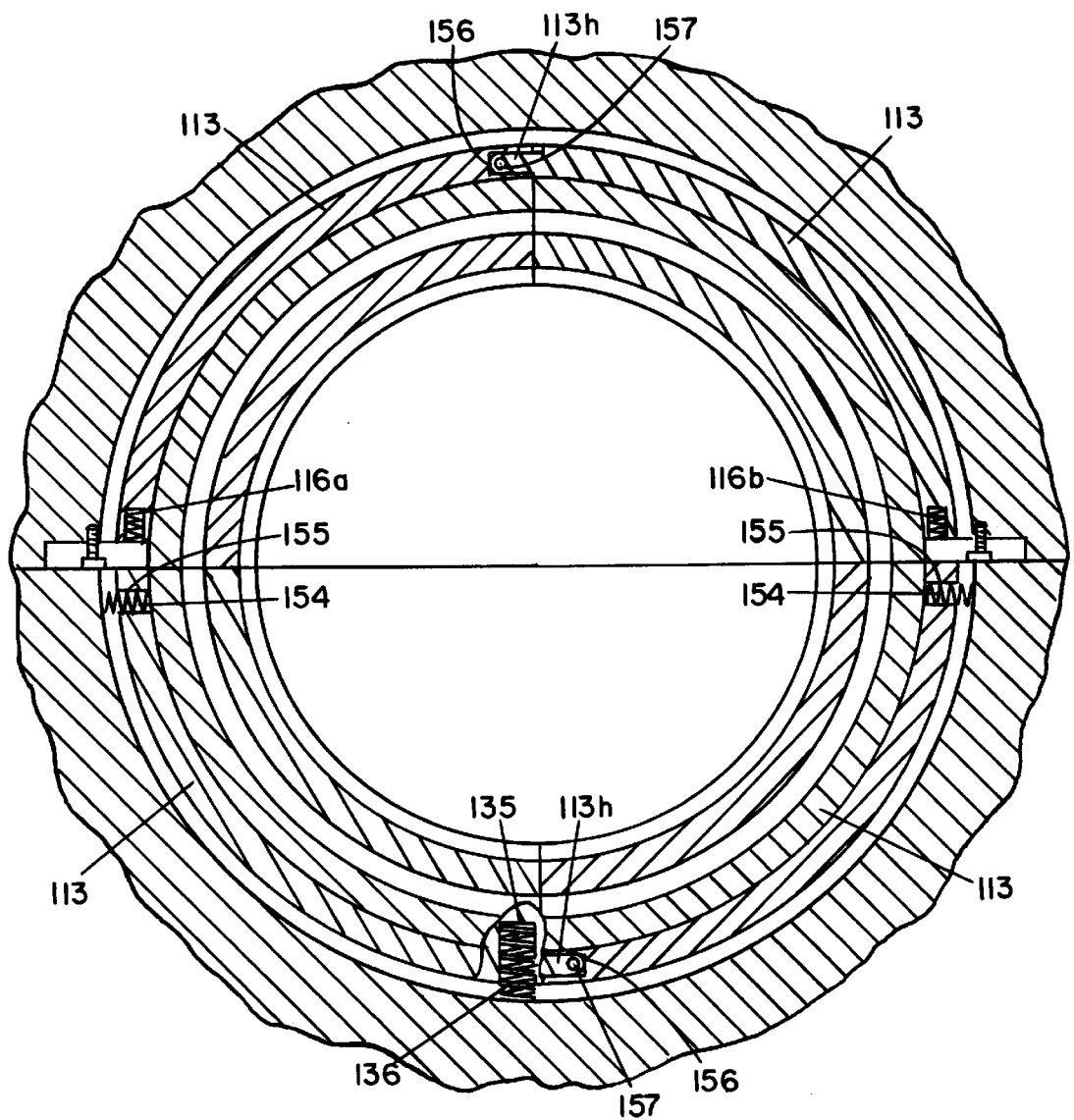
FIG. 5 is a transverse cross sectional view, taken along line 5—5 of FIG. 4, of another segmented seal ring and spring combination comprised of four segments, with two springs interposed between adjacent ends of selected segments for biasing the upper segments radially outwardly into the large clearance position, two side springs and one gravity spring for the two bottom segments, with portions broken away to better illustrate the gravity spring in the bottom segment with hinged connections of the segments at the top and bottom.

The above discussion has described an improved six segment retractable packing for low pressure drop packings. FIGS. 4, 5 and 6 illustrate an alternative system that employs four 90° segments which have a connection that hingeably connects two of the 90° segments for the upper half and two others for the lower half.

Those skilled in the art will be able to determine all forces described above thereby determining the spring forces required of the springs to achieve the objects of the invention described herein. It is preferred that all of the forces acting on each segment be summed for radial and circumferential components. When the forces resisting closing motion equal those forces causing motion, it will be known that further increase in flow will cause closing motion. The effects of these improvements provide essentially simultaneously radial motion of all segments.

FIG. 4 is a top or bottom cross section of a packing ring 113. A t the top and bottom, as shown in FIG. 5, two 90° segments 113 intersect. An extension 113h of one of the segments penetrates into an opening 156 of the other segment. A pin 157 connects the two segments by passing through aligned openings 158 and 158' respectively in extension 113h of one segment and the adjacent end of the abutting segment so as to form a hinge that permits the two segments a small amount of motion in the opening direction, as indicated in FIGS. 4 and 6. Pin 157 is secured by threads.

FIG. 5 shows that a gravity spring 136 contained in a bore 135 in the bottom of one of the 90° segments 113 has been provided to counter the weight of the two connected bottom segments when the segments are in the open position.

There will be a tendency for the sides of the two bottom segments to spread open. In cases where the pressure drop across the packing is very small for the flow condition selected for closure, side helper springs 154, located in bores 155 of segments 113 can be included to work with the pressure forces to cause the proper closing motion, while allowing the segments to stay open before that flow condition is reached.

In the upper half, vertical springs 116a and 116b are provided to counter the weight of the two connected top segments when in the open position as well as to resist pressure closing forces until the desired flow condition has been reached. At that point the segments will be permitted to start the closing motion s.

Side helper springs, not shown, similar to side helper springs 154 described above, can also be used in the upper half to help closure at the sides.

It will normally be unnecessary to provide coil springs above the upper ends of the lower segments to resist closure since as closure occurs the force of gravity spring 136 will decrease, causing some additional resistance to closure.

Figure 7:
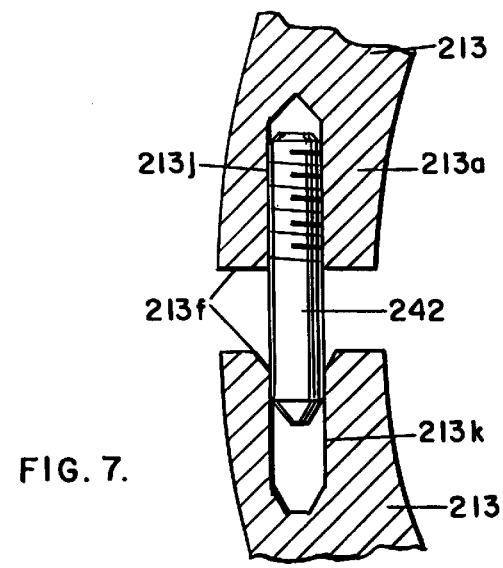
FIG. 7 is a partial cross section of the side portion of two adjacent modified-packing rings showing a pinned connection for maintaining sidewise alignment of two side segments while permitting vertical separation.

FIG. 7 indicates an additional feature which can be employed where radial motion of adjacent packing ring segments 213 requires mechanical coordination. A pin 242 is threaded into an opening 213j in a butt 213f in a suitable location, such as 213a of one segment 213. Pin 242 can bridge the largest operating gap expected between the two surfaces 213f, and in addition, penetrate into an opening 213k of the adjacent butt surface 213f to provide a positive alignment for the two segments for any operating gap. This will require that radial motion of one segment will cause a similar motion in the connected segment.

Both the end of pin 242 and the entrance of opening 213k are tapered to ensure proper entrance of the pin during initial assembly, when upper and lower halves may be misaligned.

It should be recognized that pin 242 and opening 213k will require sufficient clearance to permit oxide layer build-up. The same consideration should be given any turbine location where free motion is expected for confined components.

While the description and drawings have been provided for preferred embodiments of the present invention, various other modifications may be made without departing from the spirit and scope of the present invention. For example, the upward component of vertical force provided by each gravity spring need not fully balance or neutralize the weight component of its respective lower seal ring segment, but rather may be selected to partially balance the weight of such seal segment, in those cases where fluid pressure forces are sufficient to offset a portion of the weight of the seal segment.

What is claimed is:

1. An elastic fluid turbine employing a segmented seal ring to minimize leakage between rotating and stationary components, while also providing a large clearance between said components during start up and at light loads to protect said seal ring from damage, comprising:

a stationary turbine casing encircling a rotating shaft and having an annular groove formed therein and extending circumferentially around said shaft, said annular groove being partially defined by a pair of opposing, spaced apart annular shoulders on said casing which form an annular opening of said groove radially into the clearance area between said casing and said shaft;

a segmented seal ring supported by and at least partially contained in said groove, said seal ring including upper seal segments located around the upper half of said shaft and lower seal segments located around the lower half of said shaft, each seal segment having seal teeth;

radial springs positioned against said seal segments to urge said seal segments radially outwardly to form a larger diameter ring providing a large clearance position of said seal ring with said shaft, said large clearance position being limited by surface contact between the seal ring and the casing said radial springs providing radial outward forces whereby at low speed and small turbine loads the radial spring forces will predominate and said seal segments will be forced to said large clearance position, whereas at high flows and high working pressure, working fluid will overcome the radial spring forces and urge said seal segments into a small clearance position; and gravity spring means including one gravity spring positioned generally vertically at the bottom centerline between the lower half of said turbine casing and the lower seal segment, said gravity spring comprising a compressed coil spring having a lower end resting on but not penetrating into the lower half of said turbine casing and having an upper end penetrating into a provided bore in the lower seal segment thereby permitting assembly and disassembly of the lower seal segment even with the shaft in place, the gravity spring producing an upward vertical force against said lower seal segment which is substantially equal to and thereby counteracts the downward weight force of all said seal segments;

said segmented seal ring comprising two upper seal segments and two lower seal segments and where the upper segments are hingeably connected at the top and the lower segments are hingeably connected at the bottom, and where the upper segments are supported at the sides by radial springs to create the large clearance position, the radial springs also resisting premature motion due to pressure forces toward the small clearance position until a pre-established pressure condition is reached;

whereby said gravity spring, by neutralizing said weight forces of all said seal segments, does not interfere with the action of said radial springs to urge said seal segments out to said large clearance position at low speed and small turbine loads, allows the pressure forces to cause closure at somewhat higher loads, and encourages said segments to move simultaneously.

2. An elastic fluid turbine as recited in claim 1, wherein two additional side springs are added to provide a radially inward force just below the horizontal joint on each side of the lower seal ring segments to help provide motion toward the small clearance position.

3. An elastic fluid turbine as recited in claim 1, wherein a sliding pin connection between each upper and lower seal ring segment is provided at the horizontal joint to encourage radial inward or outward motion to occur simultaneously in both upper and lower halves.

4. An elastic fluid turbine as recited in claim 1, wherein the seal ring is comprised of six segments, namely, a top segment and a bottom segment each of the same length, and four side segments each of the same length but of a length shorter than that of the top and bottom segments.

5. An elastic fluid turbine as recited in claim 1, wherein the seal ring is comprised of six segments, namely, a top segment and a bottom segment each defining a 120° arc, and four side segments each segment defining a 30° arc, there being two 30° segments on each side, one segment above and one segment below the center line of the shaft.

* * * * *